US012801244B2

(12) United States Patent
Chang

(10) Patent No.: US 12,801,244 B2
(45) Date of Patent: Nov. 17, 2026

(54) TOUCH SENSITIVE PROCESSING METHOD AND APPARATUS AND TOUCH SYSTEM THEREOF

(71) Applicant: EGALAX_EMPIA TECHNOLOGY INC., Taipei City (TW)

(72) Inventor: Chin-Fu Chang, Taipei City (TW)

(73) Assignee: EGALAX_EMPIA TECHNOLOGY INC., Taipei City (TW)

( * ) Notice: Subject to any disclaimer, the term of this patent is extended or adjusted under 35 U.S.C. 154(b) by 0 days.

(21) Appl. No.: 19/278,829

(22) Filed: Jul. 24, 2025

(65) Prior Publication Data

US 2026/0029877 A1 Jan. 29, 2026

(30) Foreign Application Priority Data

Jul. 26, 2024 (TW) ................................ 113127911

(51) Int. Cl.
*G06F 3/041* (2006.01)

(52) U.S. Cl.
CPC ...... *G06F 3/04184* (2019.05); *G06F 3/04164* (2019.05)

(58) Field of Classification Search
CPC ............. G06F 3/04184; G06F 3/01164; G06F 3/044–0446
See application file for complete search history.

(56) References Cited

U.S. PATENT DOCUMENTS

2012/0113045 A1* 5/2012 Lai ........................ G06F 3/0416 345/173
2014/0146008 A1* 5/2014 Miyahara .............. G06F 3/0418 345/174
2020/0104003 A1* 4/2020 Matsui .................. G06F 3/0412
2021/0247874 A1* 8/2021 Ko ........................ G06F 3/0412

* cited by examiner

*Primary Examiner* — Sanghyuk Park
(74) *Attorney, Agent, or Firm* — WPAT, PC

(57) ABSTRACT

A touch sensitive processing method, comprising: receiving a synchronization signal corresponding to a frame of a touch screen; calculating multiple gate driving signal interference periods of the touch screen according to the synchronization signal; performing a mutual capacitance sensing during one of the gate driving signal interference periods to generate a first sensing image; calculating one or more first positions where one or more external conductive objects approaching or touching the touch screen based on a difference image between the first sensing image and a baseline interference image; and reporting the one or more first positions to a host.

23 Claims, 4 Drawing Sheets

TOUCH SENSITIVE PROCESSING METHOD AND APPARATUS AND TOUCH SYSTEM THEREOF

CROSS REFERENCE TO RELATED PATENT APPLICATION

This patent application is based on a Taiwan, R.O.C. patent application No. 113127911 filed on Jul. 26, 2024.

FIELD OF THE INVENTION

The present invention relates to touch screen, and more particularly, to anti-interference technique of the touch screen.

BACKGROUND OF THE INVENTION

Consumer electronics such as camera, smartphone, tablet, and notebook computers etc. make use of touch screen as main input/output devices. Normal touch screens are usually externally mounted or internally embedded. Externally mounted touch screen comprises transparent touch panel layers and underlying display layers. The display layers may include multiple TFTs (Thin-Film Transistor) for controlling the transparences of the liquid crystals. The driving voltage of the gate terminals of these TFTs are usually higher than 12 volts. The driving voltage of the gate terminals of large display can be even higher than 36 volts. When it begins or ceases to drive a gate line of TFTs, the driving voltage of the gate terminals would bring electromagnetic interference to the touch panel layers above.

The internally embedded touch screen can be further categorized into two types, on-cell and in-cell. Said Cell is referred to a display unit or a pixel of the display. The on-cell type means that the touch electrodes is disposed at a top layer or a bottom layer of the color filtering substrate and on the display unit. The in-cell type means that some of the touch electrodes are shared with the TFTs of the display, these two are integrated together. A part of the touch electrodes is embedded inside the display units. Distance between the touch electrodes and the display units in the internally embedded touch screen is shorter than the distance between the touch electrodes and the display units in the externally mounted touch screen. The internally embedded touch screen can be thinner. However, its side effects are more seriously electromagnetic interferences.

In the prior art, in order to avoid or alleviate interferences to touch sensing from the display, it is common to separate the touch sensing time period and the display controlling time period. However, the refresh rate of modern mainstream display goes higher and higher. It raises to 120 frames per second from 30 frames per second, even 180 frames per second. Time left for touch sensing is less and less. In addition, the rate of touch sensitive report required by the modern operating system also goes higher and higher. It raises up to more than one hundred times per second from few dozen times per second. Touch sensing and display refreshing compete for less and less time. Nevertheless, touch sensing inevitably interferes with display refreshing.

In summarized, there exists a need of a touch sensitive processing method for maintaining or even increasing rate of touch sensing report while avoiding or alleviating display interferences.

SUMMARY OF THE INVENTION

According to an embodiment of the present application, a touch sensitive processing method is provided. The method comprising: receiving a synchronization signal corresponding to a frame of a touch screen; calculating multiple gate driving signal interference periods of the touch screen according to the synchronization signal; performing a mutual capacitance sensing during one of the gate driving signal interference periods to generate a first sensing image; calculating one or more first positions where one or more external conductive objects approaching or touching the touch screen based on a difference image between the first sensing image and a baseline interference image; and reporting the one or more first positions to a host.

Preferably, in order to receive the synchronization signal, wherein the synchronization signal is a gate control signal corresponding to one of gate driving circuits of the touch screen.

Preferably, in order to simplify the calculating of the multiple gate driving signal interference periods, wherein the gate control signal is a gate clock signal of a first gate line of the touch screen.

Preferably, in order to receive the synchronization signal, wherein the synchronization signal is a vertical synchronization signal (VSYNC) of the frame which is emitted from a display processing unit of the touch screen.

Preferably, in order to receive the synchronization signal, the touch sensitive processing method further comprises detecting a gate driving signal emitted from one of gate lines of the touch screen, wherein the synchronization signal is the gate driving signal.

Preferably, in order to calculate the gate driving signal interference periods, wherein said calculating multiple gate driving signal interference periods of the touch screen is further based on a source of the synchronization signal, a frame refresh rate, and a temporal structure of the frame of the touch screen.

Preferably, in order to get an average baseline interference image, the touch sensitive processing method further comprises: performing multiple mutual capacitance sensing to get multiple first baseline interference images during the gate driving signal interference periods, respectively; and averaging the multiple first baseline interference images to calculate the baseline interference image.

Preferably, in order to get an average baseline interference image, the touch sensitive processing method further comprises: performing multiple mutual capacitance sensing to get multiple first baseline interference images during the gate driving signal interference periods, respectively, wherein the baseline interference image is one of the first baseline interference images.

Preferably, in order to reduce error of the calculated position, the touch sensitive processing method further comprises: before the reporting, determining whether all parts of the first sensing image are generated during another one of the multiple gate driving signal interference periods; when it is determined that all parts of the first sensing image are generated during another one of the multiple gate driving signal interference periods, performing the reporting the one or more first positions to a host; and when it is determined that not all parts of the first sensing image are generated during another one of the multiple gate driving signal interference periods, waiting until next one of the multiple gate driving signal interference periods comes and cancelling the reporting the one or more first positions to a host.

Preferably, in order to increase the rate of touch sensitive report, the touch sensitive processing method further comprises: performing a second mutual capacitance sensing during a time period other than the gate driving signal interference periods to generate a baseline image; performing a mutual capacitance sensing during another time period other than the gate driving signal interference periods to generate a second sensing image; calculating one or more second positions where one or more external conductive objects approaching or touching the touch screen based on a difference image between the second sensing image and a baseline interference image; and reporting the one or more second positions to the host.

Preferably, in order to reduce error of the calculated position, the touch sensitive processing method further comprises: before said reporting the one or more second positions to the host, determining whether all parts of the second sensing image are generated during a time period other than the gate driving signal interference periods; and when it is determined that all parts of the second sensing image are generated during a time period other than the gate driving signal interference periods, performing said reporting the one or more second positions to the host.

According to an embodiment of the present application, a touch sensitive processing apparatus is provided. The touch sensitive processing apparatus comprising: an interconnection network for connecting to touch electrodes of a touch screen; a driving circuit module and a sensing circuit module for connecting to the touch electrodes via the interconnection network; and a processor module for executing instructions stored in a non-volatile memory to command the interconnection network, the driving circuit module, and the sensing circuit module for realizing the abovementioned touch sensitive processing method.

According to an embodiment of the present application, a touch system is provided. The touch system comprising the touch sensitive processing apparatus and the touch screen.

The provided touch sensitive processing method and apparatus and the touch system can perform touch sensing while being interfered by gate driving signals of touch screen. Therefore, the provided touch sensitive processing method and apparatus and the touch system can reduce the interferences from the gate driving signals and maintain or even increase the rate of touch sensitive reports.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1:
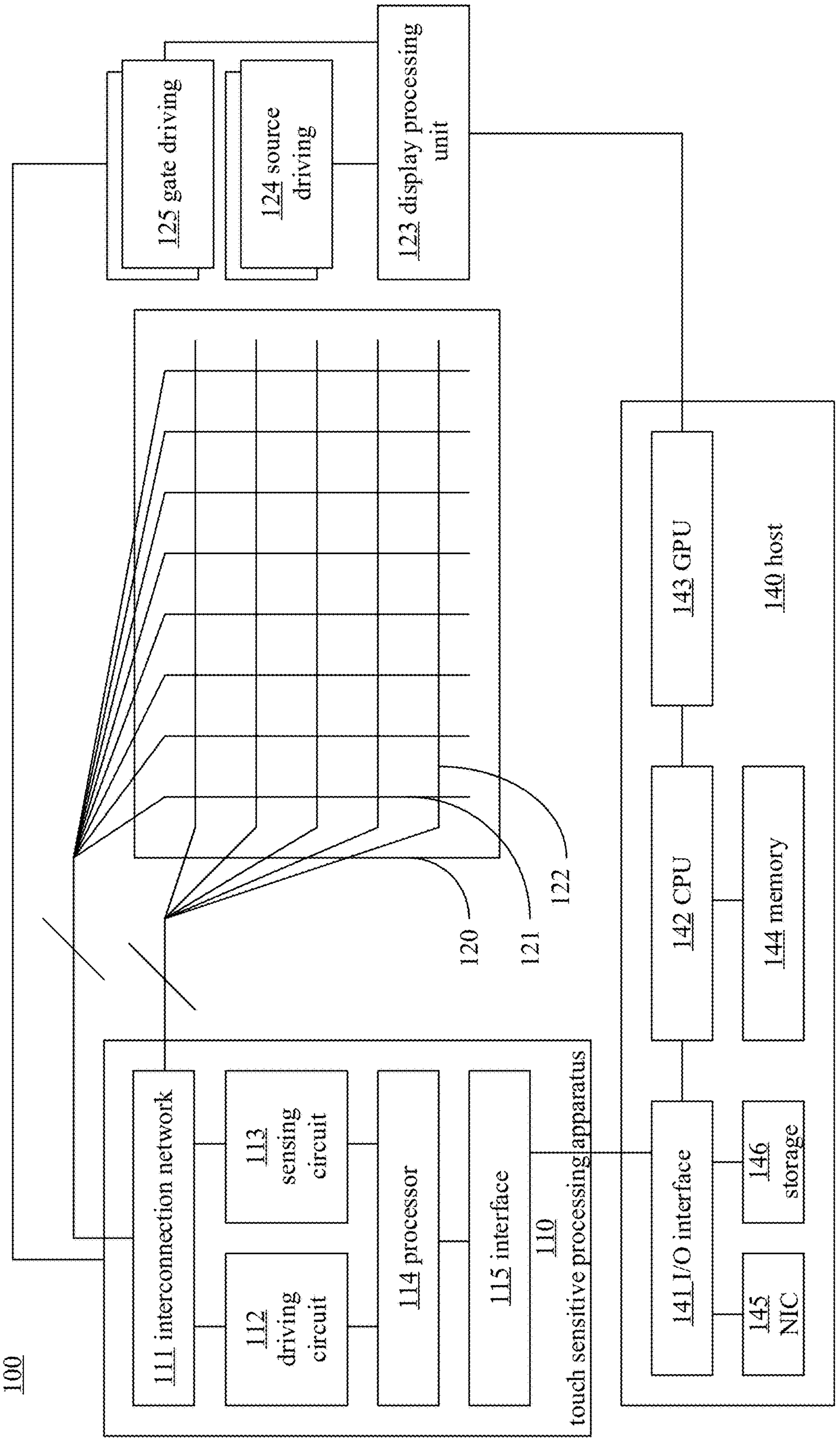
FIG. 1 shows a block diagram of a touch system in accordance with an embodiment of the present application.

Some embodiments of the present application are described in detail below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which depicts a block diagram of a touch system 100 in accordance with an embodiment of the present application. The touch sensitive system 100 may be a common desktop, laptop, tablet personal computer, industrial control computer, smartphone or any other computer system fulfilling touch sensitive functions.

The touch system 100 may comprise a touch sensitive processing apparatus 110, a touch screen 120 which connects to the touch sensitive processing apparatus 110, and a host 140 which connects to the pressure sensitive processing apparatus 110. In order to update the touch screen 120, the touch screen 120 may include a display processing unit 123, multiple source driving circuits 124, and multiple gate driving circuits 125. Each display unit or pixel may connect with one of the source driving circuits 124 and one of the gate driving circuits 125. After receiving display content from the host 140, the display processing unit 123 would control the source driving circuits 124 and the gate driving circuits 125 such that the display of touch screen 120 presents the content. As described above, the gate driving signals emitted from the gate driving circuits 125 are electromagnetic interference sources of touch signals.

The touch screen 120 comprises multiple first electrodes 121 in parallel to a first axis and multiple second electrodes 122 in parallel to a second axis. The first electrodes 121 intersect with the second electrodes 122 to form multiple sensing points or areas. Similarly, the second electrodes 122 intersect with the first electrodes 122 to form multiple sensing points or areas. In some embodiments, the first electrodes 121 may be referred to as first touch electrodes 121; the second electrodes 122 may be referred to as second touch electrodes 122. Collectively, the first electrodes 121 and the second electrodes 122 are referred to as touch electrodes. In some embodiments involving the touch screen 120, the first electrodes 121 and the second electrodes 122 are made of transparent materials. The first electrodes 121 and the second electrodes 122 may be in the same electrode layer where conductive plates of each of the first electrodes 121 or the second electrodes 122 are connected by bridging. The first electrodes 121 and the second electrodes 122 may be disposed in two overlapping electrode layers. Unless described specifically, the present application may be applicable to the embodiments include single electrode layer and the embodiments include multiple electrode layers. The first axis and the second axis are usually perpendicular to each other. However, the present application does not limit that the first axis must be perpendicular to the second axis. In one embodiment, the first axis may be a horizontal axis or a refresh axis of the touch screen 120. The first electrodes 121 and/or the second electrodes 122 may include multiple conductive plates. Person having ordinary skill in the art may refer to multiple patent applications of the Applicant to understand various embodiments of the first electrodes 121 and/or the second electrodes 122.

The touch sensitive processing apparatus 110 may comprise following hardware circuit modules: an interconnection network module 111, a driving circuit module 112, a sensing circuit module 113, a processor module 714, an interface module 115, and non-volatile memory 116. The touch sensitive processing apparatus 110 may be implemented in a single chip of integrated circuits, which may encapsulate one or more dies. The touch sensitive processing apparatus 110 may be implemented by multiple chips of integrated circuits and a circuit board connecting these chips. The touch sensitive processing apparatus 110 may be implemented in the same chip which comprise the host 140. In other words, the application does not limit how the touch sensitive processing apparatus 110 implements.

The interconnection network module 111 is configured to connect one or more first electrodes 121 and/or the second electrodes 122 of the touch screen 120, respectively. The interconnection network module 111 may receive control commands of the processor module 114 for connecting the driving circuit module 112 with any one or more touch electrodes and for connecting the sensing circuit module 113 with any one or more touch electrodes. The interconnection network module 111 may comprise a combination of one or more multiplexers to fulfill the mentioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves, or any modulated waves. The driving circuit module 112 may include one or more channel. Each channel may be connected to any one or more touch electrodes via the interconnection network module 111.

The sensing circuit module 113 may comprise integrator, sampler, clock generator, frequency divider, frequency multiplier, phase lock loop, power amplifier, operational amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 113 may demodulate the induced touch signal by another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. At the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 113 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories, and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the pressure sensitive processing apparatus 110. For examples, the processor module 114 may comprises processors widely adopted in the industry such as 8051 series, Intel i960 series, ARM Cortex-M series and etc. The present application does not limit types and numbers of processor cores included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other circuits of the touch sensitive processing apparatus 110. These instructions may include input/output interfaces of the processor module 114 to control other circuits. Other circuits may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the circuits and the instructions.

The interface module 115 may include kinds of serial or parallel bus, such as universal serial bus (USB), $I^2C$, peripheral component interconnect (PCI), PCI-Express, IEEE 1394 and other industrial standard input/output interface. The touch sensitive processing apparatus 110 connects to the host 140 via the interface module 115.

The host 140 is a main apparatus for controlling the touch system 100. It may comprise an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store a normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and the storage module 146. The CPU module 142 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor (GPU) module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

The host 140 may comprise components or apparatus not shown in FIG. 1, for example, audio input/output interface, keyboard input interface, mouse input interface, track-ball input interface and/or any other hardware circuits. Persons having ordinary skill in the art should have common knowledge of computer organization and architecture. They can understand the touch system 100 disclosed by the present application is exemplary. Parts regarding to the inventive feature provided by the present application should be referred to the specification and the claim.

In the mutual-capacitance sensing, the driving circuit module 112 provides driving signals to one of the first electrodes 121 in a time-sharing manner. While the driving signals being provided in multiple occasions, the sensing circuit module 113 is required to perform multiple sensing on all the second electrodes 122 simultaneously in order to gather sensing information in multiple one-dimensional sensing arrays. Each of the one-dimensional sensing arrays comprises sensing results corresponding to each of the second electrodes 122. The multiple one-dimensional sensing arrays can form a two-dimensional array of sensing information or a sensing image according to a sequence of the first electrodes 121 which emitted the driving signals. According to the two-dimensional array of sensing information or the sensing image, the processor module 114 can detect whether there is an external conductive object approaching or touching the touch screen 120.

In the embodiment as shown in FIG. 1, the touch sensitive processing apparatus 110 may be connected to at least one of gate control signal of the gate driving circuits 125. The gate control signal may be GCK (Gate clock) signal. When the display control unit 123 transmits the GCK signal to one of the gate driving circuits 125, which would begin to sequentially transmit gate driving signals to one or more horizontal scan line or gate line of the touch screen 120. Each horizontal scan line is corresponding to multiple display units disposed in a raw of the touch screen 120. In other words, the touch electrodes 121 and 122 corresponding to these horizontal scan lines would be interfered by the gate driving signals.

The processor 114 of the touch sensitive apparatus 110 may be aware of one of horizontal scan line would be refreshed by receiving the gate control signal. For example, in case that the gate clock signal circuit of the gate driving circuit 125 corresponding to the first horizontal scan line of the touch screen 120 is connected to the touch sensitive processing apparatus 110, the touch sensitive processing apparatus 110 is able to know the touch screen 120 is about to refresh the whole screen according to the gate clock signal of the first horizonal scan line.

In other embodiments, in case that the gate clock signal line of the gate driving circuit 125 corresponding to the N-th horizontal scan line of the touch screen 120 is connected to the touch sensitive processing apparatus 110, the touch sensitive processing apparatus 110 is able to know when the touch screen 120 is about to refresh the whole screen according to the gate clock signal of the N-th horizonal scan line and the value of the number N, where N is a natural number.

In alternative embodiments, the touch sensitive processing apparatus 110 can be directly connected to the display processing unit 123 for receiving a VSYNC signal which indicates the beginning of a frame refresh. Accordingly, the processor 114 is able to get the timing when the first horizontal scan line is refreshed according to the received VSYNC signal.

In some of the internally embedded touch screen 120, the horizontal scan line of the TFTs is utilized as said first electrode 121. When the gate driving signal is transmitted from the first horizontal scan line, the touch sensitive processing unit 110 is able to know the refresh of the whole touch screen 120 is about to begin by detecting the gate driving signal interference via the first horizontal scan line.

Except for receiving the gate control signal or VSYNC signal via particular circuit, the touch processing apparatus 110 may detect interferences caused by the gate driving signal emitted by the first horizontal scan line via the touch electrodes disposed near the first horizontal scan line. When the touch sensitive processing apparatus 100 detects the gate driving signal emitted by the first horizontal scan line via the touch electrodes, it is able to know when the refresh of the whole touch screen 120 is about to begin.

Generally, the touch processing apparatus 110 may detect interferences caused by the gate driving signal emitted by the N-th horizontal scan line via the touch electrodes disposed near the N-th horizontal scan line. When the touch sensitive processing apparatus 100 detects the gate driving signal emitted by the N-th horizontal scan line via the touch electrodes, it is able to know when the next refresh of the whole touch screen 120 begins, where N is a natural number.

Persons having ordinary skill in the art can understand that the touch sensitive processing apparatus 110 is able to get the timing of frame refresh by receiving a gate control signal or the VSYNC signal via specified circuits connecting to the gate driving signal 125 or display control unit 123 or via horizontal scan line of the internal embedded touch screen. In addition, when it is confirmed that no external conductive object approaching or touching one specified touch electrode, the touch sensitive processing apparatus 110 is able to get the timing of frame refresh by detecting electromagnetic interference caused by the gate control signal via the specified touch electrode.

Figure 2:
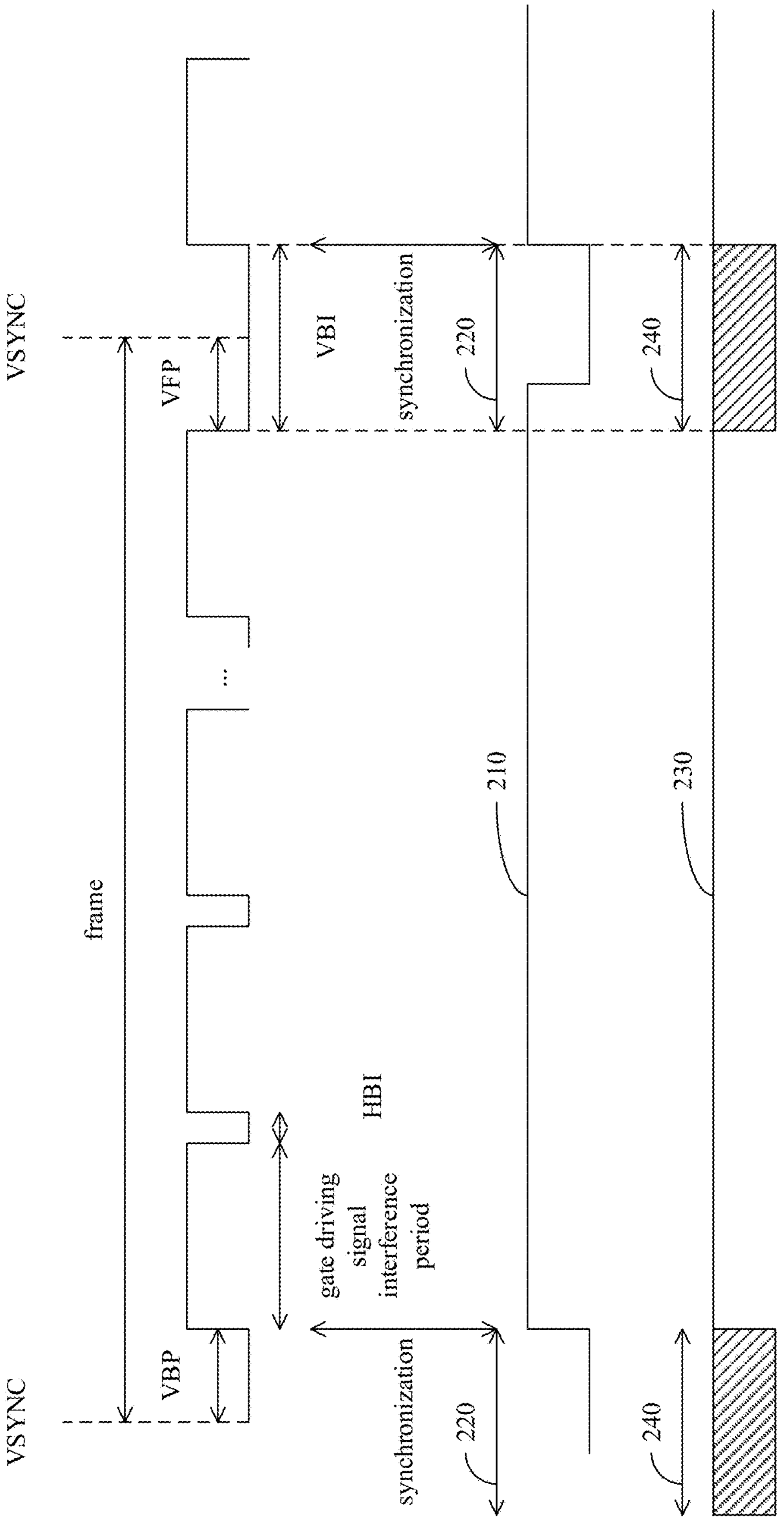
FIG. 2 illustrates timing sequences of touch sensing and frame displaying in accordance with an embodiment of the present application.

Please refer to FIG. 2, which illustrates timing sequences of touch sensing and frame displaying in accordance with an embodiment of the present application. As shown in FIG. 2, at the beginning of a frame, the display processing unit 123 would transmit a vertical synchronization signal (VSYNC). After that, a vertical back porch (VBP) time period is arranged such that circuits in the display make a preparation. After the VBP time period, multiple horizontal scan periods are followed.

During each of the horizontal scan periods, a horizontal synchronization signal (HSYNC) marks the beginning. Next, a horizontal back porch (HBP) period, a refresh period, and a horizontal front porch (HFP) period are sequentially followed. During the refresh period, the gate driving signal would be used to drive a horizontal scan line corresponding to the refresh period. Hence, there is a gate driving signal interference period during the refresh period. Because the HBP of a next horizontal scan period sits beside the HFP of a previous horizontal scan period, they are referred to as a horizontal blank interval (HBI).

After all of the horizontal scan periods, the frame further includes a vertical front porch (VFP) period. Because the VBP of a next frame sits beside the VFP of a previous frame, they are referred to as a vertical blank interval (VBI).

In the embodiment as shown in FIG. 2, HBIs are disposed between gate driving signal interference periods in a frame. There is one VBI period disposed between gate driving signal interference periods of two neighboring frames. The HBI period is much shorter than the VBI period. In case it is required to have a rate of touch sensitive report more than one hundred per second, almost each touch sensing period would cover at least one HBI period. Therefore, the touch sensitive processing apparatus 110 may ignore the HBI periods and may take multiple gate driving signal interference periods in a frame as a collective gate driving signal interference period.

Lengths of each of gate driving signal activation time periods are identical. Except for the first and the last of the gate driving signals, rest of the gate driving signals make identical or similar interference to touch electrodes. Hence, the present application makes use of the characteristics of identical or similar interference to present a novel mechanism different from the prior art. Conventionally, it was common to perform touch sensing during time periods other than gate driving signals, for example, during the VBI periods. Instead, the method provided by the present application is intended to perform touch sensing during the interference time periods caused by gate driving signals.

In some embodiments, after the touch sensitive processing apparatus 110 is aware of the collective gate driving signal interference period of each frame, one or more measurements may be performed during the collective gate driving signal interference period to get one or more baseline images. For example, when it is confirmed that no external conductive object approaching or touching the touch screen 120, the touch sensitive processing apparatus 110 may choose to perform a measurement during the collective gate driving signal interference period to get one two-dimensional array of sensing information or sensing image. Because there is no external conductive object approaching or touching the touch screen 120, the one or more sensing images would be taken as baseline interference images which are interfered by the gate driving signals.

In some examples, an averaged baseline interference image may be generated by averaging multiple baseline interference images. In some alternative examples, the touch sensitive processing apparatus 110 may choose one of the baseline interference images as the baseline interference image based on the corresponding touch sensing period. For example, three baseline interference images may be measured during an early part, a middle part, and a later part of a frame. These baseline interference images may be used to be compared with sensing images detected during the early part, the middle part, and the later part of another frame, respectively.

After one or more baseline interference images are ready, the touch sensitive processing apparatus 110 may make a mutual capacitance sensing to generate a sensing image during the collective gate driving signal period in each frame. Next, a difference comparison is performed on the sensing image and the averaged baseline interference image. Or a difference comparison is performed on the sensing image and the baseline interference image corresponding to the timing part of the mutual-capacitance sensing in a frame. The difference comparison is done by subtracting one from the other to get a difference image. The difference image represents the effects which are caused by an external conductive object approaching or touching the touch screen 120. Next, the touch sensitive processing apparatus 110 can calculate an approaching or touching position of the external conductive object based on the difference image.

In the embodiment as shown in FIG. 2, the touch sensing period 210 is mostly overlapped with the collective gate driving signal period of each frame. The last one of touch sensing may be overlapped with the VBI period. Or alternatively, the last one of touch sensing may be performed during the collective gate driving signal period. The touch sensitive processing apparatus 110 may discard the touch sensing result during the VBI period to maintain its preciseness. It means that no touch sensing is done during the period 220 or the touching sensing result during the period 220 would be discarded.

If it is desired to increase the rate of touch sensitive report, a baseline image may be measured during a VBI period. Next, a sensing image taken during another VBI period is compared with the baseline image measured during the VBI period to generate a difference image. Furthermore, an approaching or touching position of an external conductive object may be calculated according to the difference image. In an alternative embodiment as shown in FIG. 2, the baseline interference image is used for touch sensing during the touch sensing period 230. A normal baseline image is used for touch sensing during the touch sensing period 240. However, different baseline images used in different periods would increase the usage of memory.

Figure 3:
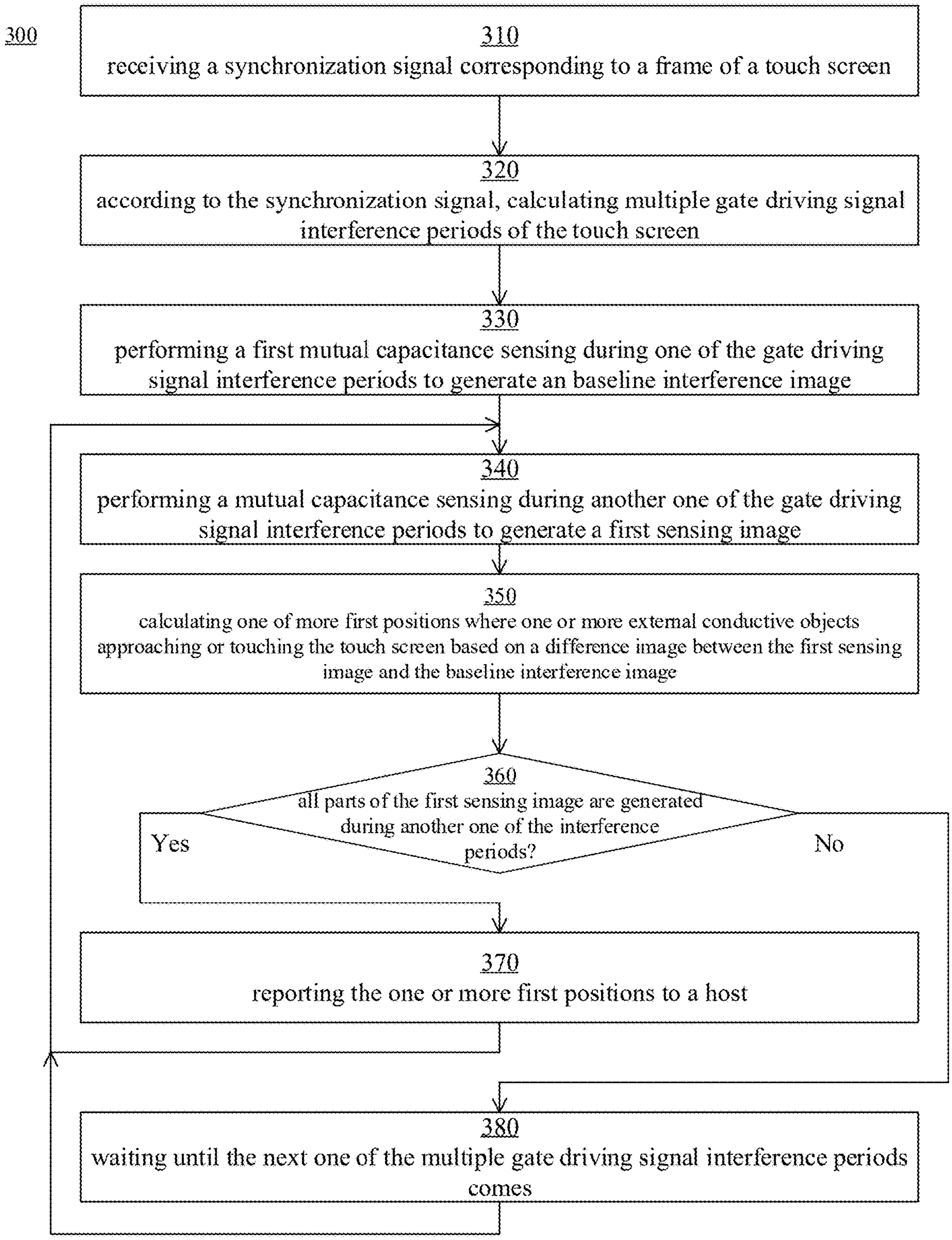
FIG. 3 depicts a flowchart diagram of a touch sensitive method 300 in accordance with an embodiment of the present application.

Please refer to FIG. 3, which depicts a flowchart diagram of a touch sensitive processing method 300 in accordance with an embodiment of the present application. The touch sensitive processing method 300 may be applied to the touch system 100 as shown in FIG. 1, especially to the touch sensitive processing apparatus 110. In some examples, the touch sensitive processing method 300 may be embodied as multiple instructions and data. The processor 114 of the touch sensitive processing apparatus 114 executes the instructions to realize the touch sensitive processing method 300. If there is no direct or indirect causal relationship between any two steps, the present application does not limit the executing sequence of these two steps. The touch sensitive processing method 300 begins at step 310.

Step 310: receiving a synchronization signal corresponding to a frame of a touch screen. As discussed, the touch sensitive processing apparatus may receive the synchronization signal via specified circuit or via detection of interference caused by gate driving signals.

Step 320: according to the synchronization signal, calculating multiple gate driving signal interference periods of the touch screen. The calculating may be based on a source of the synchronization signal and a refresh rate and a temporal structure of a frame of the touch screen.

Step 330: performing a first mutual capacitance sensing during one of the gate driving signal interference periods to generate an baseline interference image. In one embodiment, it may perform multiple times of the first mutual capacitance sensing to generate multiple first baseline interference images. And a representative baseline interference image is calculated by averaging the multiple first baseline interference images.

Step 340: performing a mutual capacitance sensing during another one of the gate driving signal interference periods to generate a first sensing image.

Step 350: calculating one of more first positions where one or more external conductive objects approaching or touching the touch screen based on a difference image between the first sensing image and the baseline interference image. In one embodiment, the baseline interference image may be calculated by averaging the multiple first baseline interference images. In another embodiment, the baseline interference image may be chosen from one of the multiple first baseline interference images.

Step 360: determining whether all parts of the first sensing image are generated during another one of the multiple gate driving signal interference periods. If the result is positive, the flow proceeds to step 370. If the result is negative, the flow proceeds to step 380.

Step 370: reporting the one or more first positions to a host. Next, the flow may return to step 340.

Step 380: waiting until the next one of the multiple gate driving signal interference periods comes. Afterward, the flow may return to step 340.

Figure 4:
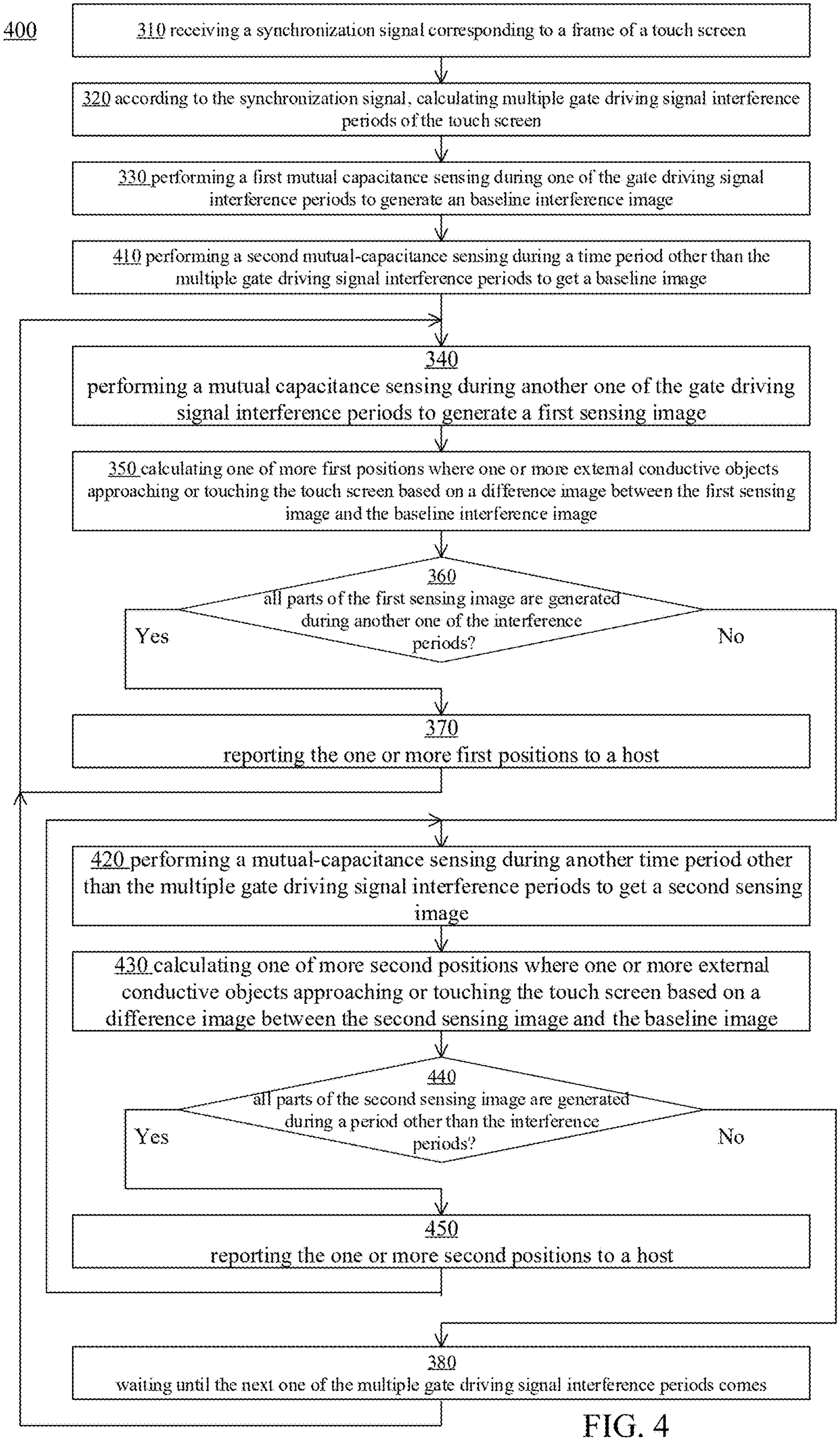
FIG. 4 depicts a flowchart diagram of a touch sensitive method 400 in accordance with another embodiment of the present application.

Please refer to FIG. 4, which depicts a flowchart diagram of a touch sensitive processing method 400 in accordance with another embodiment of the present application. The touch sensitive processing method 400 may be applied to the touch system 100 as shown in FIG. 1, especially to the touch sensitive processing apparatus 110. In some examples, the touch sensitive processing method 400 may be embodied as multiple instructions and data. The processor 114 of the touch sensitive processing apparatus 114 executes the instructions to realize the touch sensitive processing method 400. If there is no direct or indirect causal relationship between any two steps, the present application does not limit the executing sequence of these two steps.

Comparing with the touch sensitive processing method 300, the touch sensitive processing method 400 adds touch sensing during VBI periods to increase the rate of touch sensitive detection. The touch sensitive processing method 300 does not perform touch sensing during VBI periods. The touch sensitive processing method 400 takes advantage of the steps mentioned in the touch sensitive processing method 300. No duplicated description is provided here. The touch sensitive processing method 400 begins at step 310.

Step 410: performing a second mutual-capacitance sensing during a time period other than the multiple gate driving signal interference periods to get a baseline image. Comparing with the baseline interference image, the baseline image is not interfered by the gate driving signals. Persons having ordinary skill in the art can understand that the prerequisites of the step 330 and step 410 is that the touch sensitive processing apparatus 110 is sure of that no external conductive object approaching or touching the touch screen when the baseline interference image or the baseline image is generated.

Step 420: performing a mutual-capacitance sensing during another time period other than the multiple gate driving signal interference periods to get a second sensing image.

Step 430: calculating one of more second positions where one or more external conductive objects approaching or touching the touch screen based on a difference image between the second sensing image and the baseline image. In theory, if the external conductive object approaching or touching the touch screen is not moved, the first positions should be identical to the corresponding second positions, respectively. Or the distance between the first and the corresponding second positions should be less than a threshold of error.

Step 440: determining whether all parts of the second sensing image are generated during a period other than the multiple gate driving signal interference periods. If the result is positive, the flow proceeds to step 450. If the result is negative, the flow proceeds to step 380.

Step 450: reporting one or more second positions to the host.

According to an embodiment of the present application, a touch sensitive processing method is provided. The method comprising: receiving a synchronization signal corresponding to a frame of a touch screen; calculating multiple gate driving signal interference periods of the touch screen according to the synchronization signal; performing a mutual capacitance sensing during one of the gate driving signal interference periods to generate a first sensing image; calculating one or more first positions where one or more external conductive objects approaching or touching the touch screen based on a difference image between the first sensing image and a baseline interference image; and reporting the one or more first positions to a host.

Preferably, in order to receive the synchronization signal, wherein the synchronization signal is a gate control signal corresponding to one of gate driving circuits of the touch screen.

Preferably, in order to simplify the calculating of the multiple gate driving signal interference periods, wherein the gate control signal is a gate clock signal of a first gate line of the touch screen.

Preferably, in order to receive the synchronization signal, wherein the synchronization signal is a vertical synchronization signal (VSYNC) of the frame which is emitted from a display processing unit of the touch screen.

Preferably, in order to receive the synchronization signal, the touch sensitive processing method further comprises detecting a gate driving signal emitted from one of gate lines of the touch screen, wherein the synchronization signal is the gate driving signal.

Preferably, in order to calculate the gate driving signal interference periods, wherein said calculating multiple gate driving signal interference periods of the touch screen is further based on a source of the synchronization signal, a frame refresh rate, and a temporal structure of the frame of the touch screen.

Preferably, in order to get an average baseline interference image, the touch sensitive processing method further comprises: performing multiple mutual capacitance sensing to get multiple first baseline interference images during the gate driving signal interference periods, respectively; and averaging the multiple first baseline interference images to calculate the baseline interference image.

Preferably, in order to get an average baseline interference image, the touch sensitive processing method further comprises: performing multiple mutual capacitance sensing to get multiple first baseline interference images during the gate driving signal interference periods, respectively, wherein the baseline interference image is one of the first baseline interference images.

Preferably, in order to reduce error of the calculated position, the touch sensitive processing method further comprises: before the reporting, determining whether all parts of the first sensing image are generated during another one of the multiple gate driving signal interference periods; when it is determined that all parts of the first sensing image are generated during another one of the multiple gate driving signal interference periods, performing the reporting the one or more first positions to a host; and when it is determined that not all parts of the first sensing image are generated during another one of the multiple gate driving signal interference periods, waiting until next one of the multiple gate driving signal interference periods comes and cancelling the reporting the one or more first positions to a host.

Preferably, in order to increase the rate of touch sensitive report, the touch sensitive processing method further comprises: performing a second mutual capacitance sensing during a time period other than the gate driving signal interference periods to generate a baseline image; performing a mutual capacitance sensing during another time period other than the gate driving signal interference periods to generate a second sensing image; calculating one or more second positions where one or more external conductive objects approaching or touching the touch screen based on a difference image between the second sensing image and a baseline interference image; and reporting the one or more second positions to the host.

Preferably, in order to reduce error of the calculated position, the touch sensitive processing method further comprises: before said reporting the one or more second positions to the host, determining whether all parts of the second sensing image are generated during a time period other than the gate driving signal interference periods; and when it is determined that all parts of the second sensing image are generated during a time period other than the gate driving signal interference periods, performing said reporting the one or more second positions to the host.

According to an embodiment of the present application, a touch sensitive processing apparatus is provided. The touch sensitive processing apparatus comprising: an interconnection network for connecting to touch electrodes of a touch screen; a driving circuit module and a sensing circuit module for connecting to the touch electrodes via the interconnection network; and a processor module for executing instructions stored in a non-volatile memory to command the interconnection network, the driving circuit module, and the sensing circuit module for realizing the abovementioned touch sensitive processing method.

According to an embodiment of the present application, a touch system is provided. The touch system comprising the touch sensitive processing apparatus and the touch screen.

The provided touch sensitive processing method and apparatus and the touch system can perform touch sensing while being interfered by gate driving signals of touch screen. Therefore, the provided touch sensitive processing method and apparatus and the touch system can reduce the interferences from the gate driving signals and maintain or even increase the rate of touch sensitive reports.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive processing method, comprising:

receiving a synchronization signal corresponding to a frame of a touch screen;

calculating multiple gate driving signal interference periods of the touch screen according to the synchronization signal;

performing a mutual capacitance sensing during one of the gate driving signal interference periods to generate a first sensing image;

calculating one or more first positions where one or more external conductive objects approaching or touching the touch screen based on a difference image between the first sensing image and a baseline interference image; and reporting the one or more first positions to a host.

2. The touch sensitive processing method as recited in claim 1, wherein the synchronization signal is a gate control signal corresponding to one of gate driving circuits of the touch screen.

3. The touch sensitive processing method as recited in claim 2, wherein the gate control signal is a gate clock signal of a first gate line of the touch screen.

4. A touch sensitive processing apparatus, comprising:

an interconnection network for connecting to touch electrodes of a touch screen;

a driving circuit module and a sensing circuit module for connecting to the touch electrodes via the interconnection network; and a processor module for executing instructions stored in a non-volatile memory to command the interconnection network, the driving circuit module, and the sensing circuit module for realizing the abovementioned touch sensitive processing method as recited in claim 3.

5. A touch sensitive processing apparatus, comprising:

an interconnection network for connecting to touch electrodes of a touch screen;

a driving circuit module and a sensing circuit module for connecting to the touch electrodes via the interconnection network; and a processor module for executing instructions stored in a non-volatile memory to command the interconnection network, the driving circuit module, and the sensing circuit module for realizing the abovementioned touch sensitive processing method as recited in claim 2.

6. The touch sensitive processing method as recited in claim 1, wherein the synchronization signal is a vertical synchronization signal (VSYNC) of the frame which is emitted from a display processing unit of the touch screen.

7. A touch sensitive processing apparatus, comprising:

an interconnection network for connecting to touch electrodes of a touch screen;

a driving circuit module and a sensing circuit module for connecting to the touch electrodes via the interconnection network; and a processor module for executing instructions stored in a non-volatile memory to command the interconnection network, the driving circuit module, and the sensing circuit module for realizing the abovementioned touch sensitive processing method as recited in claim 6.

8. The touch sensitive processing method as recited in claim 1, further comprises detecting a gate driving signal emitted from one of gate lines of the touch screen, wherein the synchronization signal is the gate driving signal.

9. A touch sensitive processing apparatus, comprising:

an interconnection network for connecting to touch electrodes of a touch screen;

a driving circuit module and a sensing circuit module for connecting to the touch electrodes via the interconnection network; and a processor module for executing instructions stored in a non-volatile memory to command the interconnection network, the driving circuit module, and the sensing circuit module for realizing the abovementioned touch sensitive processing method as recited in claim 8.

10. The touch sensitive processing method as recited in claim 1, wherein said calculating multiple gate driving signal interference periods of the touch screen is further based on a source of the synchronization signal, a frame refresh rate, and a temporal structure of the frame of the touch screen.

11. A touch sensitive processing apparatus, comprising:
an interconnection network for connecting to touch electrodes of a touch screen;
a driving circuit module and a sensing circuit module for connecting to the touch electrodes via the interconnection network; and
a processor module for executing instructions stored in a non-volatile memory to command the interconnection network, the driving circuit module, and the sensing circuit module for realizing the abovementioned touch sensitive processing method as recited in claim 10.

12. The touch sensitive processing method as recited in claim 1, further comprises:
performing multiple mutual capacitance sensing to get multiple first baseline interference images during the gate driving signal interference periods, respectively; and
averaging the multiple first baseline interference images to calculate the baseline interference image.

13. A touch sensitive processing apparatus, comprising:
an interconnection network for connecting to touch electrodes of a touch screen;
a driving circuit module and a sensing circuit module for connecting to the touch electrodes via the interconnection network; and
a processor module for executing instructions stored in a non-volatile memory to command the interconnection network, the driving circuit module, and the sensing circuit module for realizing the abovementioned touch sensitive processing method as recited in claim 12.

14. The touch sensitive processing method as recited in claim 1, further comprises: performing multiple mutual capacitance sensing to get multiple first baseline interference images during the gate driving signal interference periods, respectively, wherein the baseline interference image is one of the first baseline interference images.

15. A touch sensitive processing apparatus, comprising:
an interconnection network for connecting to touch electrodes of a touch screen;
a driving circuit module and a sensing circuit module for connecting to the touch electrodes via the interconnection network; and
a processor module for executing instructions stored in a non-volatile memory to command the interconnection network, the driving circuit module, and the sensing circuit module for realizing the abovementioned touch sensitive processing method as recited in claim 14.

16. The touch sensitive processing method as recited in claim 1, further comprises:
before the reporting, determining whether all parts of the first sensing image are generated during another one of the multiple gate driving signal interference periods;
when it is determined that all parts of the first sensing image are generated during another one of the multiple gate driving signal interference periods, performing the reporting the one or more first positions to a host; and
when it is determined that not all parts of the first sensing image are generated during another one of the multiple gate driving signal interference periods, waiting until next one of the multiple gate driving signal interference periods comes and cancelling the reporting the one or more first positions to a host.

17. A touch sensitive processing apparatus, comprising:
an interconnection network for connecting to touch electrodes of a touch screen;
a driving circuit module and a sensing circuit module for connecting to the touch electrodes via the interconnection network; and
a processor module for executing instructions stored in a non-volatile memory to command the interconnection network, the driving circuit module, and the sensing circuit module for realizing the abovementioned touch sensitive processing method as recited in claim 16.

18. The touch sensitive processing method as recited in claim 1, further comprises:
performing a second mutual capacitance sensing during a time period other than the gate driving signal interference periods to generate a baseline image;
performing a mutual capacitance sensing during another time period other than the gate driving signal interference periods to generate a second sensing image;
calculating one or more second positions where one or more external conductive objects approaching or touching the touch screen based on a difference image between the second sensing image and a baseline interference image; and
reporting the one or more second positions to the host.

19. The touch sensitive processing method as recited in claim 18, further comprises:
before said reporting the one or more second positions to the host, determining whether all parts of the second sensing image are generated during a time period other than the gate driving signal interference periods; and
when it is determined that all parts of the second sensing image are generated during a time period other than the gate driving signal interference periods, performing said reporting the one or more second positions to the host.

20. A touch sensitive processing apparatus, comprising:
an interconnection network for connecting to touch electrodes of a touch screen;
a driving circuit module and a sensing circuit module for connecting to the touch electrodes via the interconnection network; and
a processor module for executing instructions stored in a non-volatile memory to command the interconnection network, the driving circuit module, and the sensing circuit module for realizing the abovementioned touch sensitive processing method as recited in claim 19.

21. A touch sensitive processing apparatus, comprising:
an interconnection network for connecting to touch electrodes of a touch screen;
a driving circuit module and a sensing circuit module for connecting to the touch electrodes via the interconnection network; and
a processor module for executing instructions stored in a non-volatile memory to command the interconnection network, the driving circuit module, and the sensing circuit module for realizing the abovementioned touch sensitive processing method as recited in claim 18.

22. A touch sensitive processing apparatus, comprising:
an interconnection network for connecting to touch electrodes of a touch screen;
a driving circuit module and a sensing circuit module for connecting to the touch electrodes via the interconnection network; and a processor module for executing instructions stored in a non-volatile memory to command the interconnection network, the driving circuit module, and the sensing circuit module for realizing the abovementioned touch sensitive processing method as recited in claim 1.

23. A touch system, comprising the touch sensitive processing apparatus and the touch screen as recited in claim 22.

* * * * *